No. 769,142. Patented September 6, 1904.

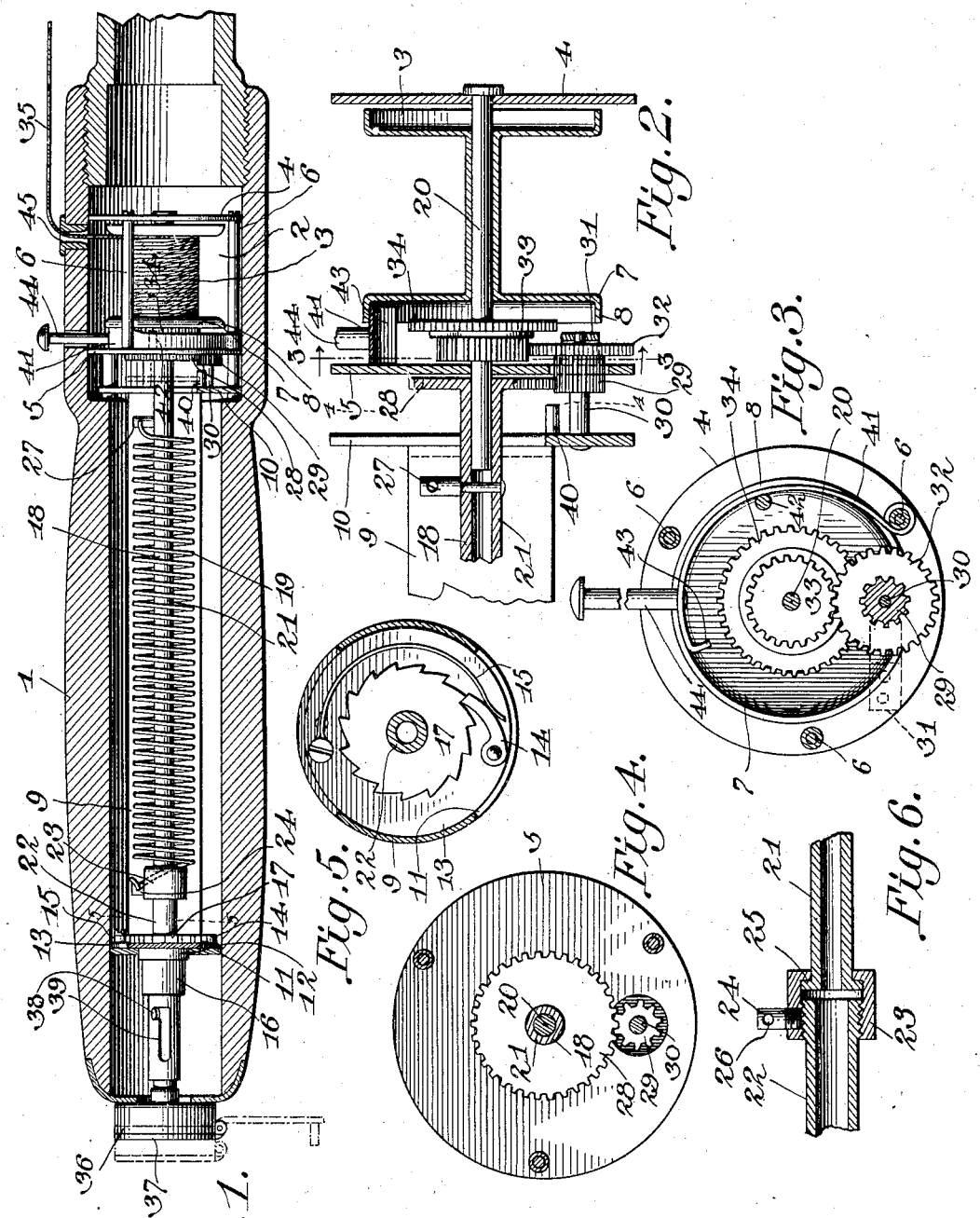

UNITED STATES PATENT OFFICE.

WILLIAM L. ATKINSON, OF FAIRHAVEN, WASHINGTON.

FISHING-REEL.

SPECIFICATION forming part of Letters Patent No. 769,142, dated September 6, 1904.

Application filed December 30, 1903. Serial No. 187,210. (No model.)

*To all whom it may concern:*

Be it known that I, WILLIAM L. ATKINSON, a citizen of the United States, residing at Fairhaven, in the county of Whatcom and State of Washington, have invented a new and useful Fishing-Reel, of which the following is a specification.

My invention relates to fishing-reels, such as are employed with rod-lines, and has for its objects to produce a device of this character which will be comparatively simple and inexpensive, one which will be wholly inclosed within the handle or grip-section of the rod, and one which is under perfect control of the operator for automatically winding the line or permitting free unwinding of the latter.

To these ends the invention comprises the novel details of construction and combination of parts more fully hereinafter described.

In the accompanying drawings, Figure 1 is a sectional elevation of the grip-section of a pole having my invention applied thereto. Fig. 2 is a central longitudinal sectional elevation through the reel and adjacent mechanism. Fig. 3 is a transverse section on the line 3 3 of Fig. 2. Fig. 4 is a sectional elevation on the line 4 4 of Fig. 2. Fig. 5 is a detail view on the line 5 5 of Fig. 1. Fig. 6 is a detail section of the joint between the shaft-sections.

Referring to the drawings, 1 designates the handle portion or grip of a fishing-rod, said handle being of any suitable construction and material, except that it is made hollow to form a chamber 2 for the reception of the reel 3 and its operating mechanism. The reel 3 is of the usual construction and mounted for rotation in a frame comprising heads 4 and 5, connected in the ordinary manner by a plurality of bars 6, one end 7 of the reel, which lies adjacent to the head 5, being concavo-convex to produce upon its outer face a peripheral flange 8, the purpose of which will hereinafter appear.

9 designates a supporting frame or member, preferably consisting of a length of strap metal bent to the form of an elongated U, disposed with its crown portion outward and having the ends of its arms riveted or otherwise secured to a substantially crescent-shaped plate 10, spaced from but securely attached by screws or otherwise to the head 5. The frame 9 has its outer crown portion or end 11 provided with a central opening, in which is fitted a collar 12, the flange 13 of which lies upon the inner face of the end 11 and carries a pivoted pawl 14, controlled by a spring 15. Extending through the collar 12 and projecting rearward from the frame is a tubular sleeve 16, provided upon its inner end with a fixed circular rack 17, the teeth of which are normally engaged by the pawl 14 to prevent backward rotation of the sleeve, for the purpose which will later appear.

Sustained within the frame 9 concentric and parallel with the axis of reel 3 is a rotary and longitudinally-movable shaft 18, upon which is mounted an actuating-spring 19. This shaft, the inner end of which is slidingly mounted upon and supported by the reel-shaft 20, which for this purpose extends beyond the head 5, consists of a primary section 21 and a secondary section 22, connected for independent rotation by a coupling member 23. This member is tapped onto the end of section 22, to which it is fixed by a screw 24, and receives an enlargement or collar 25 on the adjacent end of the section 21, the outer end of the screw 24 being perforated, as at 26. The spring 19, which is normally unwound or relaxed, has its outer end connected with the secondary shaft-section 22 by engaging its end through perforation 26 and its inner end connected with the primary shaft-section 21 by engagement with a fixed stud 27. It may here be said that when either section of the shaft is forwardly rotated in the manner presently explained the spring 19 will be wound or placed under tension.

Fixed upon the inner end of the shaft is a gear 28 in mesh with a pinion 29, disposed upon the outer face of head 5, said pinion being fixed upon a counter-shaft 30, extending through the head and journaled for rotation in a suitable bearing 31. Fixed upon the shaft 30 and lying upon the inner face of head 5 is a gear 32 in mesh with a pinion 33, fixed upon the reel-shaft which also carries a fixed circular rack 34. From this arrangement it will be seen that as the line 35 unwinds from the reel the latter will through the medium of the train of gears impart forward rotation to primary section 21 of shaft 18 and place the actuating-spring under tension, thus preparing the latter to rotate the parts in the reverse direction for rewinding the line upon the reel. The secondary section of the shaft extends through the sleeve 16 and carries at its outer end an enlargement or head 36, which lies at the end of the grip-section 1 of the pole and in turn carries a foldable crank member 37, by which the shaft may be rotated for placing the spring under tension. The secondary section of the shaft is also provided with a pin or stud 38, engaging a bayonet-slot 39 in the sleeve, whereby the said parts are locked for simultaneous rotation, and the shaft is at the same time permitted longitudinal movement of the sleeve, backward rotation of the shaft and sleeve being prevented by the pawl 14 and rack 17, as above mentioned. The shaft is movable longitudinally for the purpose of moving the gear 28 out of mesh with the pinion 29 to permit free rotation or running of the reel independently of the shaft and when so moved the gear 28 passes into engagement with a finger or stop 40, fixed upon the inner face of plate 10, whereby rotation of the shaft and consequent unwinding of the spring is prevented. When the reel is thus released, the line may run freely in making a cast, after which the gear may be again moved into engagement with the pinion to permit rewinding of the line through the action of the spring, as heretofore explaiend.

41 designates a brake in the form of a leaf-spring having one end fixed upon one of the rods 6 and its free end extending over a pin or stop 42 between the head 5 and end 7 of the reel and bearing outwardly upon the flange 8, the terminal of said spring being bent to form a pawl 43, designed for engagement with the rack 34. This spring-brake, which normally engages the flange 8 to prevent rotation of the reel under the influence of the spring, is provided with an operating member 44, preferably in the form of a headed pin extended through the wall of the handle 1, in position to be conveniently pressed by the operator, said wall being also provided with an opening 45, through which the line 35 passes.

In practice, supposing the line to be wound and the spring under tension, the operator moves the shaft longitudinally rearward, thus releasing the reel and permitting the line to run freely in making a cast. The shaft is then moved forward for reëngaging the gears, when the spring will tend to actuate the reel for rewinding the line, this action being prevented, however, by the engagement of the brake 41 with the flange 8, so that when it is desired to rewind the line the operator presses upon the operating member 44, thus freeing the parts and allowing the spring to unwind, thereby winding the line. If in practice it is desired to positively lock the reel against movement, the member 44 is pressed inward until the pawl 43 engages the rack 34.

From the foregoing it will be seen that I produce a device of simple construction which is admirably adapted for the attainment of the ends in view and one in which the reel and its mechanism will be wholly inclosed within and protected by the rod-section. In attaining these ends I do not limit myself to the precise details herein set forth, inasmuch as minor changes may be made therein without departing from the spirit of the invention.

Having thus described my invention, what I claim is—

1. The combination with a hollow rod-section, of a reel inclosed thereby, a shaft operatively connected with the reel, and a spring acting on the shaft for automatically rotating the wheel to wind a line, said shaft being operable for disengagement from the reel to permit free independent rotation of the latter.

2. The combination with a hollow rod-section, of a reel inclosed thereby, a shaft operatively connected with the reel, and a spring acting on the shaft for automatically rotating the reel to wind a line, said shaft being movable longitudinally for disengagement of the reel to permit free independent rotation of the latter.

3. The combination with a hollow rod-section, of a reel inclosed thereby, a shaft operatively connected with the reel, a spring acting on the shaft for automatically rotating the reel to wind a line, said shaft being operable for disengagement from the reel to permit free independent rotation of the latter, and means for locking the shaft against rotation during such disengagement.

4. The combination with a hollow rod-section, of a reel inclosed thereby, a pinion operatively connected with the reel, a shaft, a gear carried thereby and engaging the pinion, a spring acting on the shaft for automatically rotating the reel to wind a line, said shaft being movable longitudinally for disengagement of the gear from the pinion to permit free independent rotation of the reel, and a fixed stop adapted for engagement by the gear for locking the shaft against rotation during such disengagement.

In testimony that I claim the foregoing as my own I have hereto affixed my signature in the presence of two witnesses.

WILLIAM L. ATKINSON.

Witnesses:
J. B. CLOCK,
C. H. ALLEN.